Feb. 24, 1942.  A. A. JOHNSON  2,274,069
STEERING WHEEL ATTACHMENT
Filed Nov. 8, 1939  2 Sheets-Sheet 1
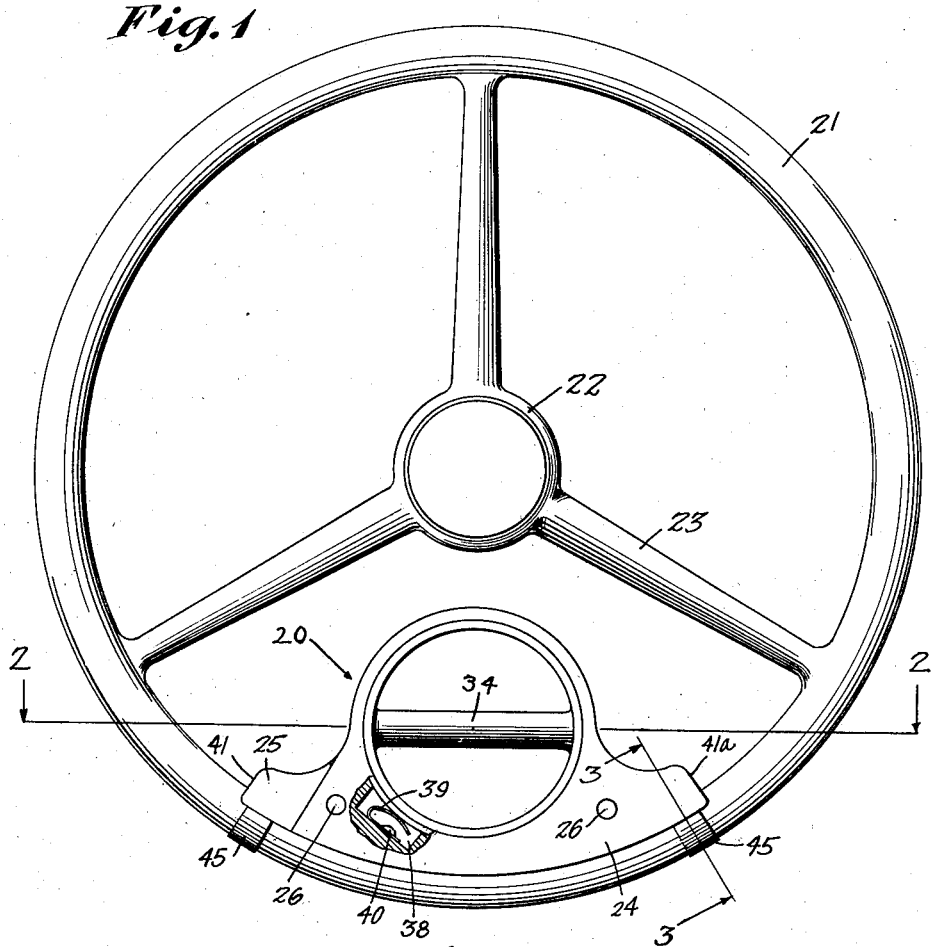
INVENTOR
Arthur A. Johnson
BY
Johnson, Klues Smyth
ATTORNEYS Feb. 24, 1942. A. A. JOHNSON 2,274,069
STEERING WHEEL ATTACHMENT
Filed Nov. 8, 1939 2 Sheets-Sheet 2
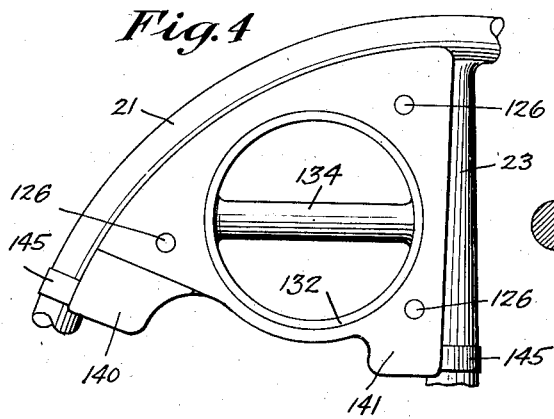
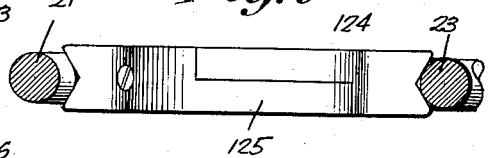
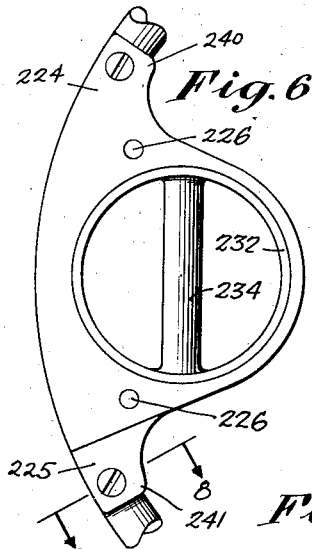
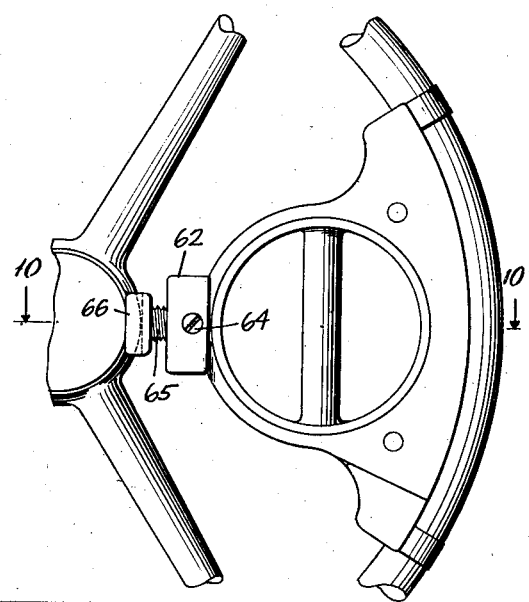
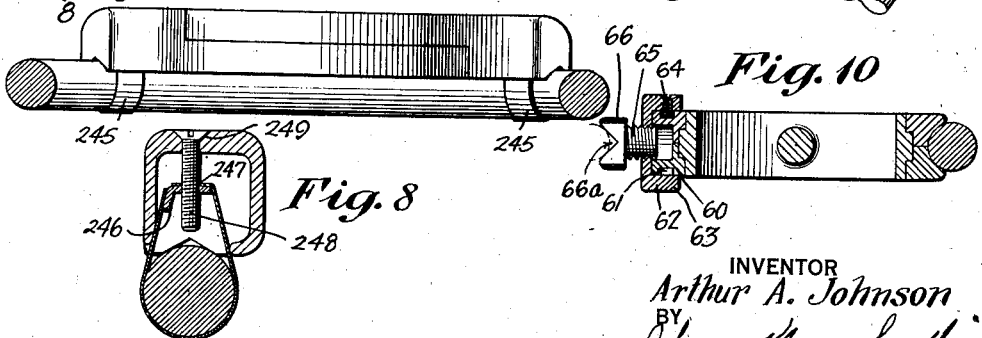
INVENTOR
Arthur A. Johnson
BY
Johnson, Klein & Smyth
ATTORNEYS Patented Feb. 24, 1942

2,274,069

UNITED STATES PATENT OFFICE 2,274,069

STEERING WHEEL ATTACHMENT

Arthur A. Johnson, Bridgeport, Conn., assignor to Casco Products Corporation, Bridgeport, Conn., a corporation of Connecticut Application November 8, 1939, Serial No. 303,441

13 Claims. (Cl. 74—557)

The present invention relates to a steering wheel attachment, and, more particularly, to an attachment of the type used in spinning the wheel which is substantially disposed in the plane of the steering wheel.

Prior attachments for steering wheels have taken the forms of knobs or projecting elements which are secured to the rim or spokes of the wheel so as to project at an angle to the plane of the wheel to provide a means which can be gripped in order to spin the wheel during turning. Such devices presented a disadvantage inasmuch as the knob projecting from the wheel presented an obstruction to free handling of the wheel and a means for catching and tearing the clothing of the user.

Efforts were made to overcome this situation by providing steering wheels with handgrips formed integrally therewith so as not to project therefrom.

While this eliminated the projecting knob, it required that, in order for the user to avail himself of such a construction, he must discard his steering wheel and apply the steering wheel incorporating this grip to his automobile.

The present invention eliminates these difficulties by providing a handgrip which may be readily attached to existing steering wheels so as to lie within and substantially in the plane of the steering wheel.

When the attachment is applied to the steering wheel, it is secured in place at spaced points by suitable means. Preferably, this is accomplished by thin straps which pass around the wheel or spoke so that they do not interfere with the gripping of the outside of the wheel as and when desired, and presents no projections which might catch on the clothing of the user as the wheel is turned.

In one form of the invention, the device is attached to the wheel to fit against the inside of the rim so as to lie substantially flush with the wheel, and is provided with clamping means at either end to draw it in engagement with the surface of the rim.

In another form of the invention, the device is shaped to fit in the angle between the rim and the spoke of the wheel and is clamped to the rim and to the spoke by straps.

If the load on the wheel is great, it may be desirable to provide a means, in addition to the securing means, for holding the attachment in the plane of the wheel. This may be accomplished by providing the device with a projection which is movable into supporting relation with the center of the wheel so as to provide a third point of support for the handgrip in spaced relation to the attaching means, or the attachment may be provided along its edges with a means for engaging an upper and lower surface of the wheel and/or spoke to hold it against movement out of the plane thereof.

The attachment of the present invention comprises two plates secured together in overlapped relation, and each provided with an aligned opening which is recessed to form a seat for a rotatable member having a handgrip extending thereacross in the plane of the member. Each plate is provided with a projecting portion in which the attaching means is located.

According to the present invention, the handgrip is held in position in the opening by a frictional drag applied thereon so that, when not in use, the handgrip will be held against rotation due to vibration of the automobile or other means to which it is attached.

Other features and advantages of the invention will be apparent from the specification and claims when considered in connection with the drawings, in which:

Figure 1 is a top plan view of a steering wheel showing the attachment in place.

Figure 2 is a longitudinal sectional view, taken along the line 2—2 of Figure 1.

Figure 3 is a sectional view of the attaching means, taken along the line 3—3 of Figure 1.

Figure 4 is a fragmentary view of a steering wheel, showing another form of the invention attached thereto.

Figure 5 is a side elevational view, looking from the bottom of Figure 4.

Figure 6 is a fragmentary view, showing a steering wheel with another form of the invention mounted thereon.

Figure 7 is a side elevational view, looking from the right in Figure 6.

Figure 8 is a sectional view of the attaching means, taken along line 8—8 of Figure 6.

Figure 9 shows a fragmentary sectional view of a steering wheel, with another form of the invention therein provided with additional supporting means.

Figure 10 is a longitudinal sectional view, taken along line 10—10 of Figure 9, with part of the center of the steering wheel removed for clearness.

The device 20 of the present invention as illustrated is constructed so that it can be clamped to existing steering wheels having continuous rims 21 supported from a central hub 22 by spokes 23 without altering the construction of the steering wheel in any manner or degree.

As shown in Figure 2, the device of the present invention comprises two plates 24 and 25 secured together by rivets, bolts or the like 26. The two plates interfit so as to provide a flat plate-like unit and are provided with aligned circular openings 27, 28. These plates are also recessed at 29, 30 on their adjoining faces to form a race 31 when the two sections are assembled.

According to the present invention, a circular member 32 having a projecting shoulder 33 is adapted to be mounted in the circular opening, when the two sections are assembled, with the shoulder riding in the race. The circular member has an element 34 extending diametrically thereacross and in the plane of the circular member to form a handgrip which can be grasped by the insertion of the fingers through the circular member and around the transversely extending element in order to spin the wheel, as will be later apparent.

In order to prevent the circular member from being freely rotated in the opening due to the vibrations of the automobile or the like, the present invention provides means for resisting free rotation thereof by applying a drag thereto. This may be accomplished in many ways. For example, the sections can be made so as to be drawn together and tighten the race on the shoulder, or, as in the illustrated form of the invention shown in Figure 1, a recess 38 can be provided in the two flat plates adjacent the raceway and a spring 39 secured therein by a pin 40 or otherwise so as to bear against the periphery of the shoulder to hold the circular member against movement. This frictional drag, of course, is not sufficient to interfere with the rotation of the circular member in the unit when in use.

Each of the plates has an extension, 41, 41a, projecting at the ends thereof. These extensions, as shown in Figure 2, extend for the full width of the unit and form a rugged means in which the means for securing the device to the steering wheel may be mounted.

As shown in Figures 1 and 2, the contacting surface 42 of the plate-like element is cut back so that it partially overlies the upper and lower surface of the wheel. Preferably, the recess is in the shape of a V so that steering wheels of different cross-sectional diameters will readily be accommodated by the device.

While the device may be attached to the wheel in any desired manner, in the preferred form of the invention the extensions are hollowed to form a socket 43 having an open mouth 44 to receive a strap 45. The strap extends around the rim of the wheel and has one end secured to a nut 46 and the other end provided with an aperture 47 and extending over the nut so that when a draft means 48 is passed through an aperture 49 in the extension it will pass through the aperture 47 in the end of the strip and be threaded into the nut secured to the other end of the strap, thus drawing both ends of the strap inwardly upon the draft means being tightened. This will draw the rim-engaging surfaces of the plate-like element into firm gripping relation with the rim.

The flap straps utilized in clamping the device to the wheel will not project beyond the outer surface of the wheel to catch in the clothing of the user, or to interfere with his handling of the wheel by the outside if he so desires.

As will be apparent from Figure 2, the extensions at either end of the unit will provide spaced attaching means for the unit to hold it within the confines of the wheel and in rigid relationship therewith.

When the unit is thus mounted on the wheel, it will be apparent that there will be no projections extending above the plane of the wheel or beyond its periphery to interfere with the operation of the wheel while the handgrip is in a convenient position to be readily gripped when it is desired to spin the wheel.

In the form of the invention shown in Figures 4 and 5, the plate-like unit is composed of plates 124 and 125 secured together by rivets 126 or the like. This plate-like unit is shaped, as shown in Figure 4, to fit in the angle formed by the juncture of the rim and the spoke. The plates are provided with extensions 140 and 141, one adjacent the rim and the other adjacent the spoke. The straps 145 are secured in the extensions in a manner similar to that shown in Figure 3 to clamp the unit to the rim and to the spoke.

In order to hold the unit firmly in place against movement out of the plane of the wheel, the edges of the unit, which engage the rim and the spoke, are recessed so as to partially overlie the upper and lower surfaces of the rim and spoke.

A circular member 132 having a transversely extending handgrip 134 is rotatably mounted in the opening of the plate-like unit in the manner previously described so that when it is desired to spin the wheel the fingers are inserted through the opening and around the member 134. The wheel can then be readily turned either to the right or left.

It may be desired to mount the attachment on the upper surface of the wheel, as shown in Figures 6 to 8. In this form of the invention, the two plate-like elements 224 and 225 are secured together by rivets 226 and are provided with aligned openings in which is mounted a circular member 232 having a handgrip 234. In this form of the invention, the extensions 240 and 241 house the attaching means which comprises straps 245 each having one end secured to a nut 246. The other end of the strap is provided with an aperture 247 and extends over the nut with the aperture in line with the aperture in the nut so that when a draft means or bolt 248 is passed through an aperture 249 in the extension it will pass through the aperture 247 in the end of the strap and also through the nut. Upon operation, the draft means will draw the ends of the strap upwardly to clamp the attachment to the upper surface of the rim.

This form of the invention will be highly desirable when the automobile is equipped with a steering wheel gear shift means or the like equipment, and it is not wanted to have any elements located in a position which might interfere with its operation.

If it is found that the load on the attachment, which is necessary to spin the steering wheel, might cause the attachment to turn about the attaching means as an axis, means can be provided for maintaining the attachment in the desired plane of the wheel.

As has already been described in connection with Figures 4 and 5, the edges of the attachment, where recessed to receive the rim and spoke, will operate to prevent any movement about the attaching means as an axis due to their engagement with the upper and lower surfaces of the rim and spoke.

This can also be accomplished by providing, as shown in Figure 9, the attachment of the type shown in Figure 1 with a neck 60 at that side opposite the rim-engaging portion. The neck faces the center hub of the steering wheel and is provided with an annular recess 61. Rotatably mounted on the neck is a nut 62 having a dependent flange 63 which extends over the annular recess 61. While the nut is freely rotatable on the neck, it is held in place against longitudinal movement by a set screw or pin 64 projecting into the annular recess 61.

As shown in Figure 10, the neck is hollow and is adapted to receive the end of a bolt 65 having its head 66 formed with a V-shaped saddle 66a to engage the upper and lower surfaces of the center hub.

When the attachment is installed, the nut is rotated to withdraw the shank of the bolt to the hollow interior of the neck and bring the saddle out of engagement with the center hub. The attaching straps are put in place and the draft means rotated so as to draw the plate-like unit into engagement with the inner surface of the rim. The nut 62 is then rotated and the bolt and the saddle-like element attached thereto is projected into engagement with the center hub.

When in this position, the attaching device will be supported at three spaced points having a triangular relationship so that the device is effectively held against rotation out of the plane of the steering wheel.

Variations and modifications may be made within the scope of this invention and portions of the improvements may be used without others.

I claim:

1. An attachment for a steering wheel comprising a flat plate-like unit having an opening therethrough; a coplanar handgrip member rotatably mounted in the opening; and means requiring no physical alteration of the steering wheel, for clamping the plate-like unit to the steering wheel at spaced points, said plate-like unit having its wheel-engaging portions shaped to receive and firmly engage steering wheels having rims of different cross-sectional diameters.

2. An attachment for a steering wheel including a flat plate-like unit, said plate-like unit comprising at least two superposed pieces, each having aligned openings and recesses on their adjoining faces adjacent the openings to provide an annular race; a circular member having a handgrip extending diametrically across the same rotatably mounted in the annular race; and means requiring no physical alteration of the steering wheel, for attaching the unit to the steering wheel at spaced points thereon, said plate-like unit having wheel-engaging portions shaped to receive and firmly engage steering wheel portions of different cross-sectional diameters.

3. An attachment for a steering wheel having a rim therearound comprising a flat plate-like unit having an opening therein; a handgrip member rotatably mounted in the opening; and means requiring no physical alteration of the steering wheel, for detachably securing the plate-like unit within the confines of the steering wheel so as to lie substantially in the plane thereof and eliminate projections therefrom, comprising flat clamping straps and draft means mounted within said plate-like unit for drawing the straps and the edge of said unit into close engagement with the steering wheel, the wheel-engaging edge of said unit being shaped to receive and firmly engage portions of steering wheels of different cross-sectional areas.

4. An attachment for a steering wheel, including a flat plate-like unit, said plate-like unit comprising two superposed sections each having aligned openings and recesses on their adjoining faces adjacent the openings to provide an annular race and each having an extension in the plane of the unit; a circular member having a handgrip extending diametrically across the same rotatably mounted in the annular race; and means requiring no physical alteration of the steering wheel, disposed in the extensions of the pieces for clamping the attachment to the steering wheel at spaced points.

5. An attachment for a steering wheel, including a flat plate-like unit, said plate-like unit comprising two superposed sections each having aligned openings and recesses on their adjoining faces adjacent the openings to provide an annular race and each having an extension in the plane of the unit, said extensions being hollowed to form a socket having rim-engaging jaws; a circular member having a handgrip extending diametrically across the same rotatably mounted in the annular race; and means requiring no physical alteration of the steering wheel, disposed in the sockets in the extensions of the pieces for drawing the ring-engaging jaws into contact with the steering wheel.

6. An attachment for a steering wheel having a circular rim and radial supporting spokes including a flat plate-like unit, said plate-like unit comprising two superposed pieces, each having aligned openings and recesses on their adjoining faces adjacent the openings to provide an annular race; a circular member having a handgrip extending diametrically across the same rotatably mounted in the annular race; and means requiring no physical alteration of the steering wheel, for attaching the unit to the steering wheel to lie in the angle formed by the rim and spoke of the wheel, said unit engaging said rim and spoke to secure the unit in position.

7. An attachment for a steering wheel comprising a flat plate-like unit having an opening therein; a handgrip member rotatably mounted in the opening; means mounted within said unit for applying a friction drag to the handgrip member to hold the same against free rotation; and means requiring no physical alteration of the steering wheel, for detachably securing the plate-like unit within the confines of the steering wheel so as to lie substantially in the plane thereof and eliminate projections therefrom.

8. An attachment for a steering wheel including a flat plate-like unit, said plate-like unit comprising two superposed pieces, each having aligned openings and recesses on their adjoining faces adjacent the openings to provide an annular race; a circular member having a handgrip extending diametrically across the same rotatably mounted in the annular race; means housed in a recess within said plate-like unit for retarding free rotation of said circular member in the race; and means requiring no physical alteration of the steering wheel, for attaching the unit to the steering wheel at spaced points thereon.

9. An attachment for a steering wheel, including a flat plate-like unit, said plate-like unit comprising two superposed sections each having aligned openings and recesses on their adjoining faces adjacent the openings to provide an annular race and each having an extension; a circular member having a handgrip extending diametrically across the same rotatably mounted in the annular race; a pocket formed in the plate-like unit communicating with the race; drag means positioned in the pocket to apply a frictional drag to the circular member to retard free movement of said member; and means requiring no physical alteration of the steering wheel, disposed in the extensions of the pieces for clamping the attachment to the steering wheel at spaced points.

10. An attachment for a steering wheel comprising a flat plate-like unit having an opening therein; a handgrip member rotatably mounted in the opening; clamp means for detachably securing the plate-like unit at spaced points within the confines of the steering wheel so as to lie substantially in the plane thereof and eliminate projections therefrom; and means engaging a portion of said steering wheel in a positive manner, for holding the unit against movement about the clamp means as an axis, said clamp means and said holding means requiring no physical alteration of said steering wheel.

11. An attachment for a steering wheel having a rim therearound supported by radial spokes from a center hub, said attachment comprising a flat plate-like unit having an opening therein; a flat handgrip rotatably mounted in the opening, said unit being shaped along its wheel-engaging portion so as to fit therearound; means carried by the unit adjacent the ends thereof for securing the unit to the rim; and means carried by the unit opposite its rim-engaging portion for supporting said unit against movement about the securing means as an axis, said securing means and said supporting means requiring no physical alteration of said steering wheel.

12. An attachment for a steering wheel having a rim therearound supported by radial spokes from a center hub, said attachment comprising a flat plate-like unit having an opening therein, said unit being shaped along its wheel-engaging portion so as to fit therearound; means carried by the unit adjacent the ends thereof or securing the unit to the rim; and means carried by the unit opposite its rim-engaging portion comprising a saddle adjustable into positive engagement with the center hub for supporting said unit against movement about the securing means as an axis, said securing means and said supporting means requiring no physical alteration of said rim or hub.

13. An attachment for a steering wheel having a rim therearound supported by radial spokes from a center hub, said attachment comprising a flat plate-like unit having a circular opening therein; a coplanar handgrip mounted in said opening for rotation with respect to the unit, said unit being shaped to fit within the angle formed by rim and spoke; means carried by the unit adjacent the ends thereof for securing the unit to the rim and spoke; and means on the unit extending along the rim-engaging and spoke-engaging portions for contacting the upper and lower faces of the same and supporting said unit against movement about the securing means as an axis.

ARTHUR A. JOHNSON.

CERTIFICATE OF CORRECTION.

Patent No. 2,274,069. February 24, 1942.

ARTHUR A. JOHNSON.

It is hereby certified that error appears in the printed specification of the above numbered patent requiring correction as follows: Page 3, second column, line 31, claim 5, for "ring-engaging" read --rim-engaging--; page 4, second column, line 11, claim 12, for "or" read --for--; and that the said Letters Patent should be read with this correction therein that the same may conform to the record of the case in the Patent Office.

Signed and sealed this 21st day of April, A. D. 1942.

(Seal)

Henry Van Arsdale,
Acting Commissioner of Patents.